US008648698B2

(12) United States Patent
Alicot

(10) Patent No.: US 8,648,698 B2
(45) Date of Patent: Feb. 11, 2014

(54) METHOD AND SYSTEM FOR RADIO FREQUENCY IDENTIFICATION TAG USING REDUCED SET COMMUNICATION PROTOCOL

(75) Inventor: Jorge F. Alicot, Davie, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 389 days.

(21) Appl. No.: 12/776,828

(22) Filed: May 10, 2010

(65) Prior Publication Data

US 2011/0273271 A1 Nov. 10, 2011

(51) Int. Cl.
- *H04Q 5/22* (2006.01)
- *H03D 3/18* (2006.01)
- *G06K 21/06* (2006.01)
- *G01R 29/02* (2006.01)

(52) U.S. Cl.
USPC .......... 340/10.1; 375/327; 375/329; 235/492; 327/31

(58) Field of Classification Search
USPC .......... 340/10.1, 10.2, 10.3, 10.4, 10.5, 10.6; 327/31; 235/492; 375/237, 239
See application file for complete search history.

(56) References Cited

U.S. PATENT DOCUMENTS

| 4,426,667 A * | 1/1984 | Masher et al. ............... 360/44 |
| 5,315,299 A * | 5/1994 | Matsumoto .................. 341/53 |
| 6,700,931 B1 * | 3/2004 | Lee et al. ...................... 375/239 |
| 7,026,935 B2 * | 4/2006 | Diorio et al. ................ 340/572.2 |
| 7,417,548 B2 * | 8/2008 | Kavounas et al. .......... 340/572.2 |
| 2003/0151497 A1 | 8/2003 | Cole et al. |
| 2005/0099269 A1 | 5/2005 | Diorio et al. |
| 2006/0261952 A1 | 11/2006 | Kavounas et al. |
| 2009/0220028 A1 * | 9/2009 | Warren ........................ 375/316 |

FOREIGN PATENT DOCUMENTS

| EP | 0600374 A1 | 6/1994 |
| EP | 0610592 A2 | 8/1994 |
| WO | 0205504 A1 | 1/2002 |
| WO | 2007060454 A1 | 5/2007 |

OTHER PUBLICATIONS

International Search Report and Written Opinion dated Aug. 1, 2011 for International Application Serial No: PCT/US2011/000630, International Filing Date: Apr. 6, 2011, consisting of 14 pages.

\* cited by examiner

*Primary Examiner* — Daniel Wu
*Assistant Examiner* — Mancil Littlejohn, Jr.
(74) *Attorney, Agent, or Firm* — Alan M. Weisberg; Christopher & Weisberg, P.A.

(57) ABSTRACT

A method and tag for decoding a signal received from a radio frequency identification ("RFID") reader. A signal is received from the RFID reader in which the signal has a series of pulses. A time frame between receipt of two consecutive pulses is measured to determine whether the pulses represent zero bits or one bits. A total pulse duration is calculated in which the total pulse duration represents a sum of the measured time frames for the signal. A command is decoded. The decoding is based on the total duration of the two pulses.

20 Claims, 3 Drawing Sheets

METHOD AND SYSTEM FOR RADIO FREQUENCY IDENTIFICATION TAG USING REDUCED SET COMMUNICATION PROTOCOL

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to security systems and more specifically to a method and system using simplified radio frequency identification ("RFID") command structures and decoding logic.

BACKGROUND OF THE INVENTION

Electronic article surveillance ("EAS") systems are detection systems that allow the identification of a marker or tag within a given detection zone. EAS systems have many uses, but most often they are used as security systems for preventing shoplifting in stores or removal of property in office buildings. EAS systems come in many different forms and make use of a number of different technologies.

A typical EAS system includes an electronic detection unit, tags and/or markers, and a detacher or deactivator. The detection units can, for example, be formed as pedestal units, buried under floors, mounted on walls, or hung from ceilings. The detection units are usually placed in high traffic areas, such as entrances and exits of stores or office buildings. The tags and/or markers have special characteristics and are specifically designed to be affixed to or embedded in merchandise or other objects sought to be protected. When an active tag passes through a tag detection zone, the EAS system sounds an alarm, a light is activated and/or some other suitable alert devices are activated to indicate the removal of the tag from the prescribed area.

Radio-frequency identification ("RFID") systems are also generally known in the art and may be used for a number of applications, such as managing inventory, electronic access control, security systems, and automatic identification of cars on toll roads. An RFID system typically includes an RFID reader and an RFID device. The RFID reader may transmit a radio-frequency ("RF") carrier signal to the RFID device. The RFID device may respond to the carrier signal with a data signal encoded with information stored by the RFID device.

The market need for combining EAS and RFID functions in the retail environment is rapidly emerging. Many retail stores that now have EAS for shoplifting protection rely on bar code information for inventory control. RFID offers faster and more detailed inventory control over bar coding. Retail stores already pay a considerable amount for hard tags that are re-useable. Adding RFID technology to EAS systems can easily pay for the added cost due to improved productivity in inventory control as well as loss prevention.

An important consideration in designing RFID tags is to include EAS functionality, such as including the ability to deactivate or "kill" a tag as well as the ability to reactivate the tag. Failure to deactivate ("FTD") is a major complaint affecting all EAS detection platforms. This undesirable side effect poses a serious confidence issue to system users, who inadvertently grow accustomed to "deactivated" tags triggering an alarm, thus, ignoring valid alarm events where live tags are involved. This phenomenon occurs when a tag, or label, is not properly deactivated and still carries some properties of a live tag.

However, designing an RFID tag with the capability to detect "kill" and reactivate commands from an RFID reader is not without inherent difficulties. The ability to recognize and decode these commands requires more complex logic and a large number of logic gates, thus increasing the complexity and costs associated with manufacturing ASICs for use in RFID tags. There have been other attempts to address this issue. Tags using EPC-CIG2 or ISO1800-6C protocols use multiple configuration settings, larger memory usage, and multiple interface functions. Although these protocols allow for EAS functionality, they do so with complex designs and prohibitively expensive die costs. Other RFID solutions implement very simple tag protocols and memory formats that may reduce die costs but these protocols provide inadequate performance and generally do not allow the tag to implement EAS features. Including an EAS bit that can be verified by the RFID reader does not solve the problem because once "killed" the tag is "dead" and cannot be read. Only a reactivate command issued by the interrogator re-commissions the tag for use.

At least part of the prohibitive costs associated with designing tags to decode incoming interrogation commands to "kill' or reactivate an RFID tag is due to the design of the ASIC within the RFID tag. Going through each bit of information in the interrogation signal requires complex design schemes since every single bit of information in the signal must be decoded in order for the tag to properly identify what command is being sent. This requires a large number of logic gates to read and decode each bit of information that is transmitted by the RFID reader, rending present decoding schemes impractical due to the exorbitant costs associated with such designs.

What is therefore needed is a simplified and streamlined decoding process that will permit the RFID tag to enable EAS functionality by efficiently determining the identity of the commands transmitted by the RFID reader thus reducing the complexity and costs associated with ASIC design.

SUMMARY OF THE INVENTION

The present invention advantageously provides a method and system for a radio frequency identification ("RFID") tag that uses a command decoding process based on pulse counting. The pulse counting method allows RFID tags to be fabricated using fewer logic gates compared with existing systems.

In accordance with one aspect, the present invention provides a method for decoding a signal received from a radio frequency identification ("RFID") reader. A signal is received from the RFID reader in which the signal has a series of pulses. A time frame between receipt of two consecutive pulses is measured to determine whether the pulses represent zero bits or one bits. A total pulse duration is calculated in which the total pulse duration represents a sum of the measured time frames for the signal. A command is decoded. The decoding is based on the total duration of the two pulses.

In accordance with another aspect, the present invention provides a circuit for use in a radio frequency identification ("RFID") system in which the circuit has a receiver and a decoder. The receiver is arranged to receive a signal from an RFID reader. The signal is comprised of a series of pulses.

The decoder is operable to measure a time frame between receipt of two consecutive pulses in order to determine whether the pulses represent zero bits or one bits, calculate a total pulse duration in which the total pulse duration represents a sum of the measured time frames for the series of pulses and decode the command. The decoding is based on the total duration of the pulses.

In accordance with still another aspect, the present invention provides a radio frequency identification ("RFID") tag having an antenna and an integrated circuit. The antenna is arranged to receive a pulse width modulated ("PWM") signal. The PWM signal has a series of pulses. The integrated circuit is in communication with the antenna. The integrated circuit has a receiver in communication with the antenna and a decoder. The decoder operates to measure a time frame between receipt of two consecutive pulses in order to determine whether the pulses represent zero bits or one bits, calculate a total pulse duration in which the total pulse duration represents a sum of the measured time frames for the series of pulses and decode the command. The decoding is based on the total duration of the pulses.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
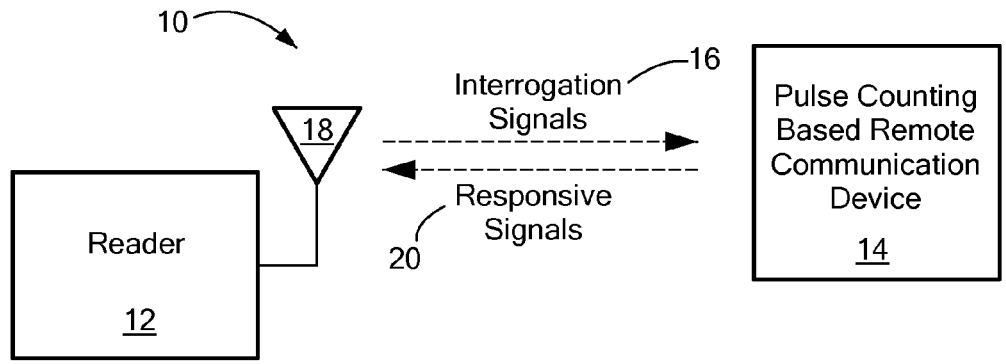
FIG. 1 is a block diagram of a radio frequency identification detection system constructed in accordance with the principles of the present invention.

Before describing in detail exemplary embodiments that are in accordance with the present invention, it is noted that the embodiments reside primarily in combinations of apparatus components and processing steps related to implementing a system and method for decoding interrogation command signals received from an RFID reader in accordance with the principles of the present invention. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements, there is shown in FIG. 1 a diagram of an exemplary system constructed in accordance with the principles of the present invention and designated generally as "10". FIG. 1 illustrates a system that includes an RFID reader 12 and one or more remote communication devices (tags) 14 affixed to one or more items. Although only one reader 12 and one tag 14 are shown in FIG. 1, the invention is not so limited and may include any number of these devices.

System 10 is a surveillance system that combines the theft prevention features of an EAS security system with the item identification features of an RFID identification system. System 10 has the capability of alerting staff employees of a potential theft while the customer is still inside the store. Combining EAS functionality with RFID technology can potentially provide manufacturers great benefit since they can use RFID to track inventory through the supply chain and use EAS functions within the same tag to secure items on the retail floor.

Referring again to FIG. 1, the RFID reader 12 could be in the form of, for example, a reader unit used to transmit interrogation signals 16 to tag 14. Reader 12 can include a radio frequency module (transmitter and receiver), a control unit, a coupling element to the tags, and a power supply. Additionally, many readers are equipped with interface hardware to enable them to send data received from the tags to another system, e.g., PC, automatic control systems, etc.

Reader 12 includes an RFID antenna 18 having both EAS elements and RFID elements. The antenna 18 emits radio signals to activate the tag 14 and read and/or write data to it. Antenna 18 provides the conduit between the tag 14 and the reader 12, which controls the system's data acquisition and communication. Typically, the electromagnetic field produced by antenna 18 is constantly present. If constant interrogation is not an application requirement, then a sensing device can activate the electromagnetic field thereby conserving power.

Tag 14 is an electronic transmitter/responder, typically placed on or embedded within an object, representing the actual data-carrying device of an RFID interrogation system. Tag 14 responds to a transmitted or communicated request signal 16 for its encoded data from an interrogator, i.e., reader 12. Tags 14 emit wireless signals over an open air interface using radio frequency waves to communicate with one another. Tags 14 include an passive RFID component and may optionally include an EAS element such as an acousto-magnetic ("AM") component. In order to retain the ability to deactivate or "kill" tags within the interrogation area, system 10 includes tags 14 that have the capability to detect deactivate and reactivate commands from reader 12.

The reader 12 emits radio waves in an interrogation range, the range varying depending upon the power output and the frequency used. As a tag 14 enters and passes through the electromagnetic zone, it senses the reader's activation signal. Reader 12 then decodes the encoded data within the tag's integrated circuit (IC) and passes the data to a host computer for processing. Typically, the antenna 18 is packaged with the transceiver and decoder in reader 12. RFID reader 12 can be a hand-held device or in a fixed-position/fixed-mount configuration depending upon the desired application. Antenna 18 includes an RFID patch antenna and may include an EAS loop antenna. Antenna 18 is capable of transmitting RFID and optionally EAS interrogation signals 16 to tag 14 and is also capable of receiving responsive communication signals 20 from tag 14.

Figure 2:
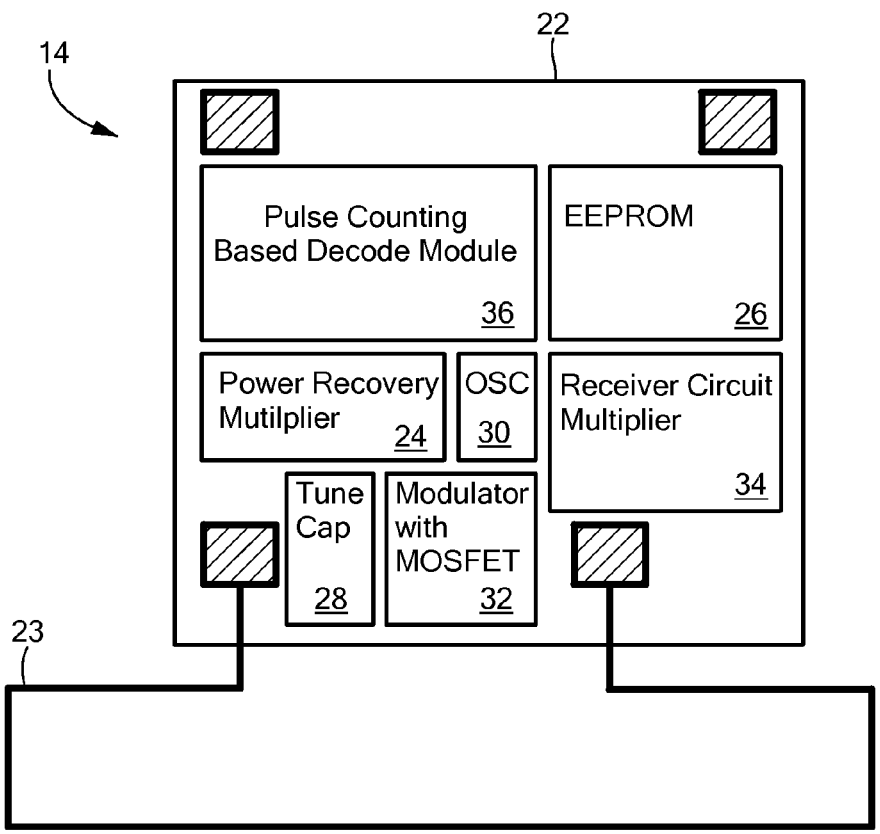
FIG. 2 is a block diagram of an exemplary ASIC embedded in an RFID tag constructed in accordance with the principles of the present invention.

RFID tag 14 includes an application specific integrated circuit ("ASIC") 22 and an antenna 23, an exemplary design of which is shown in FIG. 2. ASIC 22 includes a power recovery unit 24, a memory module 26, which can include programmable memory such as flash memory, Electrically Erasable Programmable Read-Only Memory ("EEPROM"), Read Only Memory ("ROM") or One Time Programmable ("OTP") memory. ASIC 22 also includes a tuning capacitor 28, an oscillator, 30 a modulator 32, receiver circuitry 34, and a pulse counting based decode module 36.

Decode module 36 includes a processor and the hardware and software to decode incoming interrogation signals from RFID reader 12. Although reference is made to hardware and software within the context of decode module 36, it is understood that the functions performed by decode module 36 can be implemented using gated logic and not solely by executing software stored in memory 26. ASIC 22 is part of RFID tag 14 as part of the RFID interrogation system 10 depicted in FIG. 1. ASIC 22 is designed according to the principles of the present invention such that a multi protocol-friendly interface combining aspects of, for example, EPC-C1G2 protocol, EAS functionality, and a reduced command set architecture is presented. The result is a low cost design approach to RFID/EAS designs that allows for the implementation of simplified command structures. This results in fewer logic gates in decoding module 36, a more efficient command signal decode mechanism and lower ASIC design costs as compared with existing devices.

Figure 3:
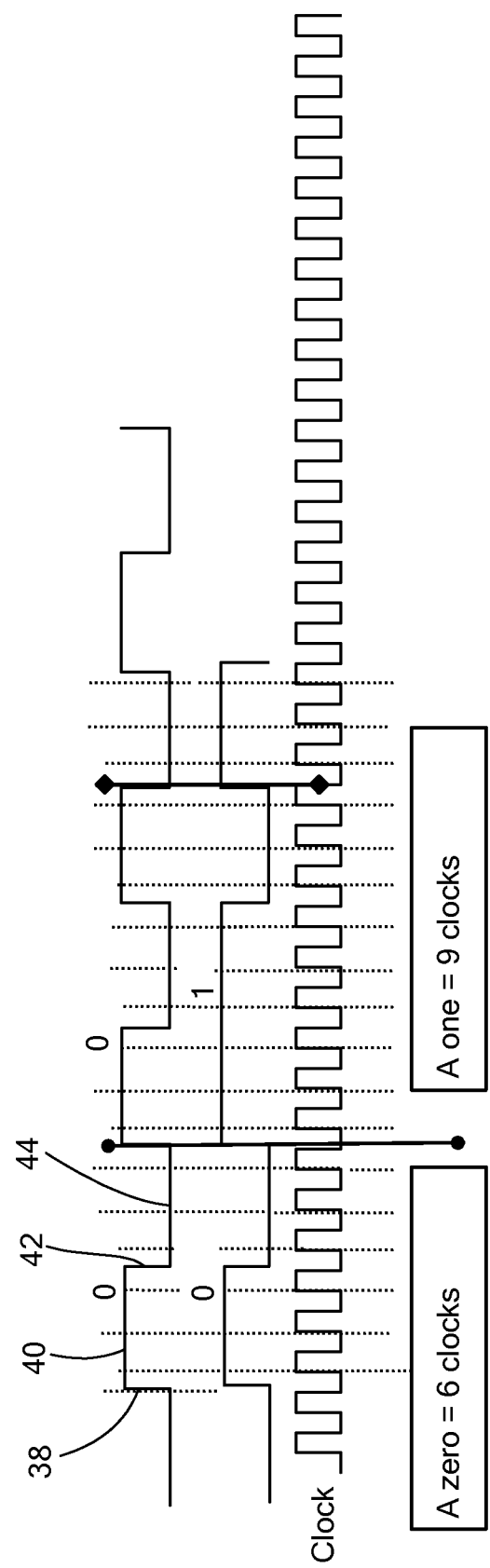
FIG. 3 is a timing diagram illustrating the pulse counting method of the present invention.

The present invention implements a decoding scheme that, instead of analyzing each bit of an incoming command signal from RFID reader 12, analyzes the time interval between a number of pulses in a pulse width modulation ("PWM") stream. By utilizing this approach, incoming signals can be recognized as specific commands without the inefficiency of having to analyze each bit of the signal. This approach can be seen in FIG. 3, which illustrates the pulse counting approach of the present invention. The decoding method of the present invention decodes interrogator commands by counting the time elapsed between a group of incoming pulses of a PMW signal received from RFID reader 12. In one embodiment, the number of positive pulse edges of consecutive pulses is counted. The invention is not limited to detecting only the positive pulse edges and can also be adapted to detect the number of negative pulse edges of consecutive pulses. For example, FIG. 3 shows two incoming pulse streams. Each pulse represents either a "0" or a "1" and has associated with it a series of clock cycles. In one embodiment, ASIC 22 employs a signaling schema where a pulse representing a "0" is defined as a 50% duty cycle pulse referred to as Tari. In this embodiment, a pulse includes an initial positive edge 38, a high level 40, a negative edge 42 and a low level 44. A complete pulse is measured from its initial positive edge until the next positive edge.

Thus, in the example shown in FIG. 3, a pulse representing a "0" is six clock cycles long (measured from one positive edge to the next positive edge), while a pulse representing a "1" is nine cycles long. It should be noted that the duration of the pulses shown in FIG. 3 is exemplary only. Thus, the pulse representing a "1" has a high period that is approximately 3 clock cycles longer than the high period for a "0" pulse and, consequently, two pulse edges occur in a shorter period of time when decoding two zeros, than when decoding a 0 and 1 combination. The method of the present invention extends this approach to develop a simpler and more efficient decoding method.

Thus, decoding module 36 adds the total time interval between a group of positive pulse edges for a given pulse stream and uses this time interval or "count" as representative of a particular "decode outcome". Decode outcomes having the same or similar time interval are grouped together. While traditional decoders validate and decode each bit in the stream, i.e., determine if the bit is a one or a zero, store the recovered bit in a register, decode the next bit to store in register, and continue until the correct number of bits are received where the recovered bits are then decoded from the register, the present approach does not validate and decode individual bits and avoids the bit-by-bit storage process and the counting of the number of bits received. Instead of decoding individual bits, a count is used that encompasses multiple bits, as well as multiple samples of bit times.

By detecting the time between pulses rather than decoding each bit one at a time, the result is a reduced number of available decoding outcomes. This is illustrated in the following table using three-bit decode scheme.

| Code | Count Decode Outcome | Counts based on 3 clock cycles per half Tari. |
| --- | --- | --- |
| 000 | 1 | 18 (6 + 6 + 6) |
| 001 | 2 | 21 (9 + 6 + 6) |
| 010 | 2 | 21 (9 + 6 + 6) |
| 011 | 3 | 24 (9 + 9 + 6) |
| 100 | 2 | 21 |
| 101 | 3 | 24 |
| 110 | 3 | 24 |
| 111 | 4 | 27 (9 + 9 + 9) |

In the illustrated embodiment, the interrogation signal from the RFID reader 12 uses three bits. Using the table above along with the diagram in FIG. 2, it is seen that instead of the traditional single-bit identification and decoding method which produces eight different outcomes, using the pulse count over time method of the present invention results in only four outcomes (based on the count). For example, a PWM signal that includes three successive "0" bits would take eighteen clock cycles (three successive 6-cycle pulses), a 001 series, a 010 series or a 100 series each comprise 21 clock cycles (6 cycles for the "0" bit and 9 cycles for the "1" bit), and a 011 series, a 101 series, or a 110 series each comprise 24 clock cycles. If select commands are not dependent upon the exact location of the "1" bit then it is only important to determine how many "1" bits are in the stream. For example, a total clock cycle of 21 means that only one of the three-bit-stream is a "1" bit and the other two bits are "0" without determining where the "1" bit is actually located in the pulse.

The present invention employs a simplified command structure that includes a limited number of EAS functions such as a "kill" command to disable the RFID tag 14 and a "re-activate" command that restores the tag. The simplified commands can be decoded utilizing the decoding method of the present invention described above, where only the time interval between successive pulses is measured in order to determine the identity of the command, since the simplified commands are not distinguishable by the order of the bit stream.

An example of the simplified command structure and decoding method of the present invention will now be illustrated. Initially, the number of pulses to be expected during a time interval is determined by the calibration component of RFID reader 12 prior to signaling for tag communication. Calibration signaling is used to tune the tag's oscillator 30 for ASIC operation and for back scatter modulation. In one embodiment that is compatible with EPC-CIG2 command signaling protocol, three commands are supported: a QUERY command, a Query_Rep (Query response) command, and an ACK (acknowledge) command. Each of these commands may have further constraints as to limited parameters and their scope of operations. Incoming commands are decoded based on the protocol state and the number of pulses received in a specific time period. A "1" or a "0" signal transmission includes a level transmission change. ASIC 22 recognizes the number of bits that have been received when a level change does not occur over a given period of time. When the time period expires (corresponding to longest time before expected pulse width) without a level change, it is interpreted as the end of the command signal.

In one embodiment, commands are distinguished by identifying a count for the expected number of bits. For example, after initial calibration, an initial two-pulse sampling (sampling of the first two bits in the incoming pulse stream) occurs to narrow down the possible commands to a QUERY command. A single "1" in the first two pulses of the transmission from RFID reader 12 corresponding to a 1000 or 0100 is decoded as a QUERY command. Although the initial code of 01XX or 10XX can represent a number of commands, only the QUERY command includes a "00" for the third and fourth digits. Therefore, instead of decoding each bit in order to determine its identity, decoding module 36 only has to determine that the count includes a single "1" in either of the first two bits of the transmitted stream and only zero bits in the second two bits of the stream and to identify the command as a QUERY command. This is done by counting the time frame between successive bits within the sampled stream and identifying the time interval between successive "0" and "1" bits (or between successive "1" and "0" bits), which, as described above, different than the time interval between successive "0" bits. It is not necessary to determine where the "1" bit is located in the first two pulses, only that a "1" bit is included in the first two bits and the last two pulses are both zero bits. After the decode process described above, RFID tag 14 counts down until its slot timer reaches 0. The QUERY command can include a field that defines how many slots are available for RFID tag 14 to randomly select.

In another example, after a synchronization process, a two-pulse decode is performed to identify the next command as a Query_Rep command. Two zeros correspond to a "00" transmitted by the interrogator corresponds to a Query_Rep command since no other command includes two consecutive initial zero bits. Thus, measuring the time frame between successive "0" pulses reveals that the first two bits are zeros and the command is determined to be a Query_Rep command. This command is processed if the tag is in the arbitrate state. Prior to being in the arbitrate state, a four-bit decode, or greater, can be performed.

Another example of the decoding method of the present invention is the "acknowledge" or "ACK" command. The decoding scheme of the present invention identifies an ACK command as having a single "1" bit in the first two transmitted pulses. Thus, a single "1" corresponding to a 10 or 01 transmission from the interrogator is decoded as the ACK command. This is a two-bit decode that can be performed only if tag 14 is in the acknowledge state. In one embodiment, the ACK command is decoded once the ASIC has provided an RN16 number and the state machine transitions to an acknowledge state.

Thus, the present invention provides a reduced cost RFID approach by implementing command protocols such as EPC-C1G2 in existing RFID readers 12 without modifying the readers by providing a simplified and efficient ASIC 22 design with improved logic, using fewer logic gates than traditional ASIC designs. This is accomplished by counting the time duration between a group of pulses instead of decoding individual bits and by limiting the number of commands that RFID reader 14 is able to decode. The selected commands can, for example, relate to EAS functionality. The RFID reader 12 sets its parameters according to the command structure implemented by the RFID tag's decode methodology.

An example of how the decoding method of the present invention is applied to RFID commands under a standard EPC-C1G2 protocol, is now discussed. The system of the present invention may want to write data such as identification information to tag 14. For example, the command received from RFID reader 12 is "1110000110000000". A decode function according to the present invention is performed to narrow down the possible commands to an EPC-C1G2 "reserve for proprietary" command, which is designated by the first eight bits of the bit stream above, which is 11100001. This code determines if the command is a "reserved for proprietary" command. The decoder then counts the pulse time of the next 8 pulses to determine if a write command is in process. A pulse width modulated train of "1000" followed by 4 modulated bits of zeros, identifies a write function. The decode process of the present invention decodes the first four bits to determine if a "1" bit is followed by four "0" bits, and if the last four bits are all "0" bits. The decode function can decode the 8 bit command at once or it can be broken into lesser number of bit decodes. The identification information is then written to tag 14. Optionally, the transfer can include a cycle redundancy check ("CRC"). A read of the tag 14 may then be performed to verify the write function.

In another embodiment, EAS commands that deactivate and reactivate the RFID tag 14 are included in the simplified command structure of the present invention. In order to identify a "Kill" command from RFID reader 12, ASIC 22 first performs a decode to narrow down the possible commands to a "Reserve for proprietary command" designated by bit stream 11100001. Decoding module 36 counts the pulse time of the next 8 pulses to determine if a "Kill" command is in process. For example, a pulse width modulated train of "1100" followed by 4 modulated bits of zeros identifies a "Kill" function, which deactivates RFID tag 14. The decode function can decode the 8 bit command or it can be broken into lesser number of bit decodes.

When the "Kill" command is implemented, ASIC 22 is deactivated and will only respond to a "Reactive" command. This command includes a write operation to the activation bit. Due to higher power requirements, the "Reactivate" command requires closer proximity operation than read-only operations. To reactivate a tag that has been deactivated, a "Reactivate" command is implemented. This command requires a write operation to the activation bit of ASIC 22. The command allows the tag 14 to resume operation and to respond to reader 12. The tag's ID and content are preserved to the values prior to the tag 24 being deactivated. A "Reset" command causes tag 14 to reenter the tag population for interrogation.

When tag 14 is ready to receive communications from reader 12, a calibration process occurs. Calibration signaling initiates tag communication from the reader 12. Based on its state, RFID tag 14 determines which calibration signals to processes, i.e., the preamble or Frame-sync. After calibration, this approach decodes the reader command based on pulse width modulation. Once RFID tag 14 receives an "Acknowledge" or "ACK" command from RFID reader 14, it will stop responding until a power cycle occurs or a reset command is issued. Retention of tag state can vary in time after power is removed.

The following describes another embodiment of the present invention in an RFID interrogation environment. RFID tags 14 enter the interrogation field of an RFID reader 12 and receive a QUERY command. The QUERY command is issued to one of two inventory states, for example, "State A" or "State B". Only tags in the state associated with the QUERY command participate in interrogation sessions. RFID tag 14 selects a random slot within the Q-value provided as part of the QUERY command. The value may be constrained by the protocol design parameters that are to be determined. When its time slot comes up, tag 14 provides a random number. In the C1G2 protocol for example, a received Acknowledge response ("ACK") from the reader 12, within a defined period of time, will cause the tag 14 to transmit its EPC ID memory and CRC. An acknowledged tag transitions to a different inventory state, for example State B, and does not participate in subsequent Query interrogations targeting inventory A. The tag 14 will not respond to any subsequent queries until a RESET command is received. If a QUERY or Query_Rep command is received instead of an ACK command, the tag does nothing and waits for the next QUERY command.

In one embodiment, tag 14 is silent if after its EPC ID transmission it receives confirmation according to the C1G2 protocol timing. In another embodiment, a reset command or power cycle of greater than 1 second, for example, will cause tag 14 to reenter the tag population to be interrogated. A time extension can be implemented for the reception of an acknowledge command ("ACK") by tag 14. The confirmation is the reception of a QUERY or Query_Rep command (after tag 14 sends its ID), within a predetermined time period. However, the time period can be extended, for example, a maximum of 200 μSec, and associated to Tari as a multiple of the tari time. If a QUERY or Query_Rep command is not received within 200 uSec, tag 14 does not go to a silent state and participates in the next QUERY round. If an Acknowledge ("ACK") command is not received, the tag 14 waits for the next query command to participate in the new interrogation cycle. If an acknowledge command is received, the tag 14 will not participate in interrogations unless a reset command or power cycle occurs. This approach advantageously provides more capability for lower performance readers. In one embodiment, ASIC 22 uses 112 bits for EPC ID and CRC, a 250 KHz down link with miller 8 or 4 back scatter encoding and operates with a 25 μSec Tari.

Figure 4:
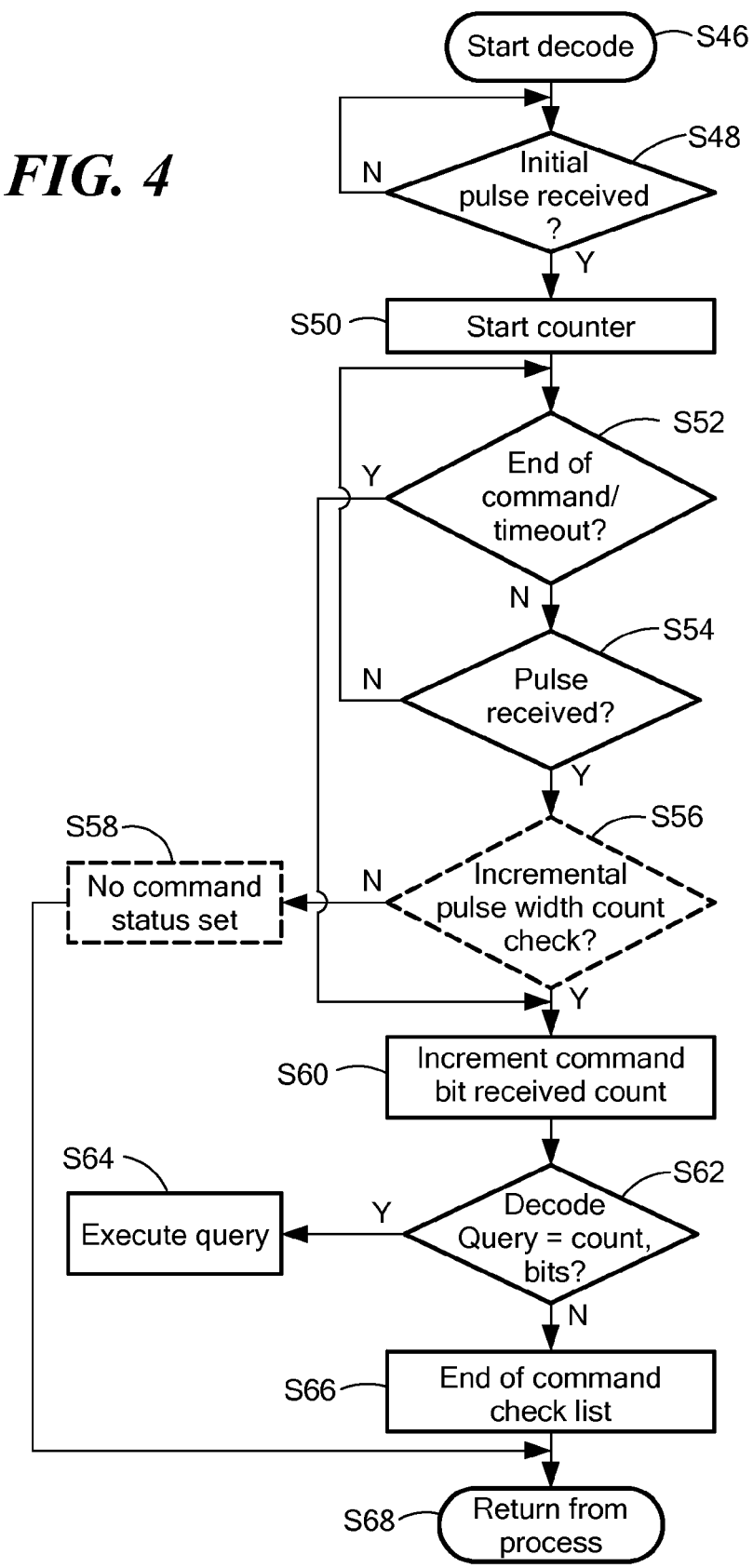
FIG. 4 is a flowchart illustrating the command decoding process used by the present invention.

FIG. 4 is a flowchart illustrating a decode sequence between tag 14 and reader 12 according to the principles of the present invention. An RFID tag 14 within an interrogation zone of reader 12 begins its decode process (step S46) by waiting for an initial wireless PWM signal from the reader 12 (step S48). The bit counter within the tag is started (step 50). Tag 14 count bits until a time interval occurs indicating the end of the transmission (step S52) while continuing to wait for and receive incoming PWM command pulses (step S54). Tag 14 is arranged to store in advance the number of bits it can expect to receive in the PWM command. Tag 14 can therefore validate the pulse width count range and can optionally conduct a valid bit check (step S56). Optionally, if the transmitted number of bits does not match the number of bits expected, no command status is set (step S58) and the process terminates (step S68).

If the bit check is valid, decode module 36 continues to count the number of bits received (step S60), and decodes the command (step S62) by utilizing the total bit count to determine the identity of the command as described above. If the command is identified it is executed (step S64). A series of checks, such as, for example, setting operational flags in order to respond to received commands, or performing housekeeping operations to set up for the next command, is performed at the end of the command (step S66) before the process terminates and returns for another round of decoding (step S68).

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of decoding a signal received from a radio frequency identification ("RFID") reader, the method comprising:
   receiving a signal from the RFID reader, the signal comprising a series of pulses;
   measuring a time frame between receipt of two consecutive pulses, the measured time frame indicating receipt of a bit;
   calculating a total pulse duration to receive a predetermined quantity of bits, the total pulse duration representing a sum of the measured time frames for the signal;
   decoding a command, the decoding being based on the calculated total pulse duration to receive the predetermined total quantity of bits; and
   each individual bit in the predetermined quantity of bits remaining un-decoded during the decoding of the command.

2. The method of claim 1, wherein each pulse is represented by a positive edge and a negative edge and wherein measuring the time frame between receipt of two consecutive pulses includes measuring the time frame between receipt of two consecutive positive edges.

3. The method of claim 1, wherein the measured time frame further indicates at least one of a one bit and zero bit.

4. The method of claim 1, wherein each pulse includes a high period and a low period where a pulse with a bit value of one has a high period that is longer in duration than the high period of a pulse having a bit value of zero.

5. The method of claim 4, further comprising determining when transmission has ceased by detecting an interval of time when there is no transition from one of the high period to the low period and from the low period to the high period, and determining if the interval of time exceeds a predetermined time frame.

6. The method of claim 1, wherein the decoding based on the calculated total pulse duration is performed irrespective of bit value positions within the predetermined total quantity of bits.

7. The method of claim 1, wherein decoding the command occurs if the total duration of the pulses is recognized as corresponding to a valid command.

8. A circuit for use in a radio frequency identification ("RFID") system, the circuit comprising:
a receiver, the receiver arranged to receive a signal from an RFID reader, the signal comprising a series of pulses; and
a decoder, the decoder configured to:
measure a time frame between receipt of two consecutive pulses, the measured time frame indicating receipt of a bit;
calculate a total pulse duration to receive a predetermined quantity of bits, the total pulse duration representing a sum of the measured time frames for the series of pulses; and
decode the command, the decoding being based on the calculated total pulse duration to receive the predetermined total quantity of bits; and
each individual bit in the predetermined quantity of bits remaining un-decoded during the decoding of the command.

9. The circuit of claim 8, wherein each pulse is represented by a positive edge and a negative edge and wherein measuring the time frame between receipt of two consecutive pulses includes measuring the time frame between receipt of two consecutive positive edges.

10. The circuit of claim 8, wherein the decoder is further operable to track a total number of pulses received in order to determine when transmission has ceased.

11. The circuit of claim 10, wherein each pulse includes a high period and a low period where a pulse with a bit value of one has a high period that is longer in duration than the high period of a pulse having a bit value of zero.

12. The circuit of claim 11, wherein the decoder determines when transmission has ceased by detecting an interval of time when there is no transition from one of the high period to the low period and from the low period to the high period, and determining if the interval of time exceeds a predetermined time frame.

13. The circuit of claim 8, wherein the decoder decodes the command if the total number of pulses received equals an expected total number of pulses.

14. The circuit of claim 8, wherein the decoder decodes the command if the total count is recognized as corresponding to a valid command.

15. A radio frequency identification ("RFID") tag, comprising:
an antenna arranged to receive a pulse width modulated ("PWM") signal, the PWM signal having a series of pulses; and
an integrated circuit in communication with the antenna, the integrated circuit comprising:
a receiver in communication with the antenna; and
a decoder, the decoder operable to:
measure a time frame between receipt of two consecutive pulses, the measured time frame indicating receipt of a bit;
calculate a total pulse duration, the total pulse duration representing a sum of the measured time frames for the series of pulses; and
decode the command, the decoding being based on the calculated total pulse duration to receive the predetermined total quantity of bits; and
each individual bit in the predetermined total quantity of bits remaining un-decoded during the decoding of the command.

16. The RFID tag of claim 15, wherein each pulse is represented by a positive edge and a negative edge and wherein measuring the time frame between receipt of two consecutive pulses includes measuring the time frame between receipt of two consecutive positive edges.

17. The RFID tag of claim 15, wherein the decoding based on the calculated total pulse duration is performed irrespective of bit value positions within the predetermined total quantity of bits.

18. The RFID tag of claim 15, wherein the decoder decodes the command if the total number of pulses received equals an expected total number of pulses.

19. The RFID tag of claim 15, wherein the decoder decodes the command if the total count is recognized as corresponding to a valid command.

20. The RFID tag of claim 15, wherein each pulse includes a high period and a low period and wherein the decoder the decoder determines when transmission has ceased by detecting an interval of time when there is no transition from one of the high period to the low period and from the low period to the high period, and determining if the interval of time exceeds a predetermined time frame.

* * * * *